United States Patent [19]

Winterburn

[11] Patent Number: 4,835,544
[45] Date of Patent: May 30, 1989

[54] PRINTING AND PACKAGING SYSTEM AND IDENTIFYING AN ITEM OF PRINTED MATTER

[75] Inventor: Charles B. Winterburn, Cheshire, United Kingdom

[73] Assignee: Laser Impressions (Stockport) Limited, Cheshire, United Kingdom

[21] Appl. No.: 109,018

[22] Filed: Oct. 16, 1987

[30] Foreign Application Priority Data

Oct. 16, 1986 [GB] United Kingdom ................. 8624808

[51] Int. Cl.$^4$ .............................................. G01D 9/00
[52] U.S. Cl. .................................. 346/1.1; 346/33 R; 346/33 A; 346/44
[58] Field of Search .................. 346/1.1, 24, 44, 33 R, 346/33 A, 75, 76 R; 235/379

[56] References Cited

U.S. PATENT DOCUMENTS

| | | | |
|---|---|---|---|
| 3,703,628 | 11/1972 | Philipson, Jr. | 346/75 X |
| 3,988,571 | 10/1976 | Blair et al. | 235/379 |
| 4,027,142 | 5/1977 | Paup et al. | 235/379 |
| 4,393,386 | 7/1983 | DiGiulio | 346/1.1 |

FOREIGN PATENT DOCUMENTS

| | | |
|---|---|---|
| 132782 | 2/1985 | European Pat. Off. . |
| 975803 | 11/1964 | United Kingdom . |
| 1186922 | 4/1970 | United Kingdom . |
| 1233583 | 5/1971 | United Kingdom . |
| 1414817 | 11/1975 | United Kingdom . |
| 1492136 | 11/1977 | United Kingdom . |
| 1500137 | 2/1978 | United Kingdom . |
| 2085209 | 4/1982 | United Kingdom . |

*Primary Examiner*—J. R. Scott
*Attorney, Agent, or Firm*—Flynn, Thiel, Boutell & Tanis

[57] ABSTRACT

In a high volume printing and packaging operation, stationery is fed by document feeder 10 to a laser printer 14. The printer prints both text and discrete identification code on the page both text and code being supplied from a system controller 16. The document is then folded by folder 22 and the code read. Enclosures are added as dictated by the code and the code read again prior to insertion in an envelope by inserter 24. A correct code verification causes an ink-jet printer 26 to print the name and address on the envelope. The marking code comprises a series of small marks normally unnoticeable to the normal observer and each representing a digit, whose value depends on the position of the mark on a notional circle whose center is a fixed distance from a pair of reference marks.

17 Claims, 3 Drawing Sheets

PRINTING AND PACKAGING SYSTEM AND IDENTIFYING AN ITEM OF PRINTED MATTER

FIELD OF THE INVENTION

This invention relates to automated printing systems and in particular to a system for printing and packing mail and to a method of identifying an item of printed matter to be packed.

DESCRIPTION OF PRIOR ART

There is a need to provide documents with machine-readable indications which enable the document to be identified automatically. Various methods already exist for this purpose. Obvious examples include writing on the document with an OCR type font which can be read and identified with an optical character reader, or marking it with a bar code or with, for instance, dark lines along the edge of the paper. Such methods are not however ideal where a high quality of aesthetic presentation is required.

SUMMARY OF THE INVENTION

The present invention is defined in the appended claims to which reference should now be made.

Automatic identification of printed matter is especially important in large volume high speed printing operations in which an item of printed matter, for example a letter, has to be matched up with an envelope bearing the correct address.

An example of a system and method embodying the invention will now be described with reference to the drawings, in which:

DESCRIPTION OF BEST MODE

Figure 1:
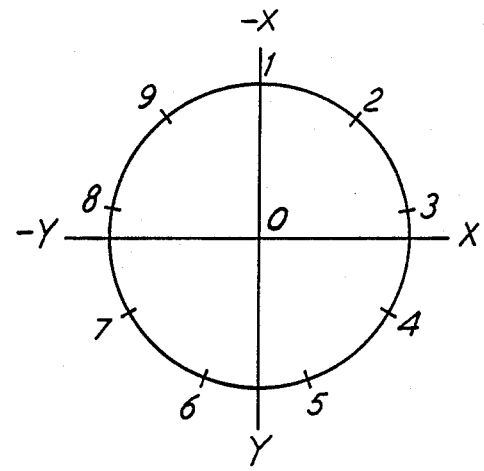
FIG. 1 illustrates how the digits of a single decade may be coded.

FIG. 1 shows how the digits 1–9 can be represented by a simple position code. Relative to the centre 0 of a circle C, nine points are defined on the circumference of the circle at 40° spacings. As shown the digits 1 to 9 are shown sequentially around the circle, but they could be in another random order if any element of secrecy was required or for other reasons. Thus any digit can be coded by a simple dot at any one of these nine positions, relative to the centre of the unprinted circle. The digit zero is represented by the absence of a dot.

Figure 2:
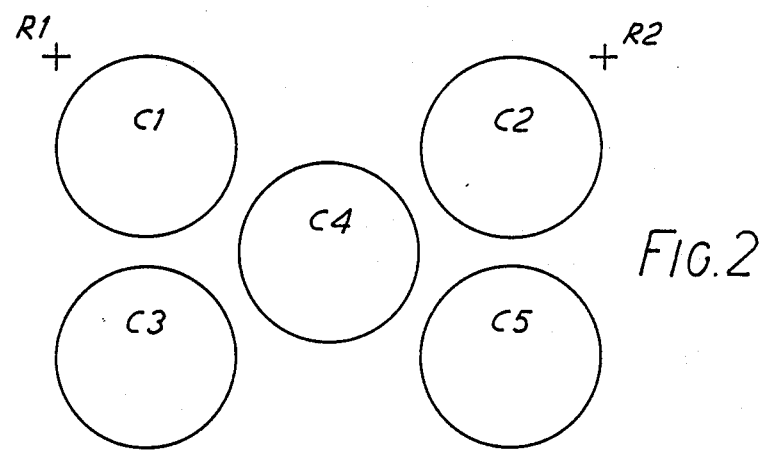
FIG. 2 illustrates how the codes for a 5-digit number can be combined.
Figures 3, 4:
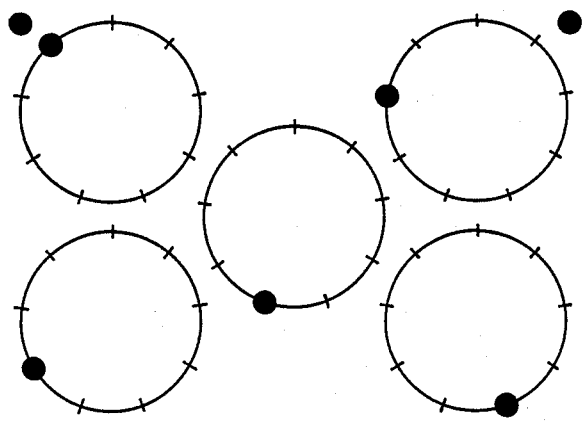
FIG. 3 shows a coded representation of a 5-digit number.
FIG. 4 illustrates how the representation of FIG. 3 relates to the coding scheme of FIGS. 1 and 2.

FIG. 2 shows five such circles in an array to allow the representation of a five digit number. The position of the array of circles is related to two reference points R1 and R2. A five digit number is then coded by taking the respective digits and placing dots on the circumferences of each of the five circles C1 to C5 to represent those digits. Thus the number 56789 might be coded as shown in FIG. 3 by seven dots, namely two dots at the reference positions and five dots respectively coding the five digits. This is illustrated in FIG. 4 which shows FIG. 3 superimposed on the circles of FIG. 2. As shown, circle C1 is used for the least significant digit and circle C5 for the most significant digit.

The figures show the coding pattern on a greatly enlarged scale. The radius of each circle is 3 mm and the circles are 1mm apart, i.e. their centres are spaced by 7 mm. The reference points R1 and R2 are 3 mm above and 3 mm to one side of the centres of the closest circles. The dot size can vary depending on the application but will not exceed 1 mm in diameter. A dot size of 3 pixels is possible and recognition of a single pixel has been achieved, the dot being triangular in shape and being about 0.4 mm along the medial of the triangle. In this way a coding system is provided which can be incorporated into textual matter in such a way as to be unnoticeable to the normal reader of the test while still providing a unique machine readable identification.

Furthermore, the coding or identifying operation takes place on the same run through the printer so there is no danger of the code being applied to the wrong item and there is no need for different special inks for example. In practice the registration mark is applied using a powder toner.

It is an important feature of the preferred system that the coding array can be located anywhere on the printed page, and the place chosen can be such as to minimise visibility. For example, the array can be interlineated with the lines of printed text.

Nevertheless, although being machine readable, the code can readily be read by an instructed user of the system who is provided with a transparent overlay which can be placed over the code to interpret the number which has been coded. As previously mentioned, the dot applied is triangular (although any other shape could be used). The code reader detects both the presence of the toner on the page and also the shape of detected marks. In this way errors caused by misreading impurities in the paper or spurious printing marks are avoided. Shape detection distinguishes to the identication marks from the text printed on the sheet, which are printed using the same powder.

Thus in use the code may be used to permit identification of letters being printed as part of a direct mail advertising operation. In such a process letters are printed which are individually addressed to addressees whose details are stored in a list in a computer controlling the printer. The text of the letter is identical in each case, except perhaps for minor variations dependent upon details in the address list. Each addressee has a numeric identification and this identitication number is coded as described above and printed at a selected part of the letter where it is least visible to the reader.

Envelopes are addressed by the computer and fed to an inserter where they are to receive the letters. At this point the codes on the letters can be read to ensure that the right letter is put into the right envelope. Expensive and embarrassing mistakes can thus be avoided without the need to use inelegant window envelopes or to have manual checking. Nevertheless, the quality of presentation of the letter is not noticeably degraded.

In order to determine precisely where to print the dot to represent a given digit the computer holds tables giving the required print positions. This it does in three stages. First it holds a record of the position of the reference dot R1 relative to the edges of the paper. This is selected by the user. The dot R2 is defined relative to reference to dot R1 by the geometry of the arrangement shown in FIG. 2 as being 6+7 3 mm=18.124 mm to the right of dot R1.

The computer then holds in a look-up table the positions of the centres of the circles relative to reference dot R1. The convention which is normal for a printing operation, is used that X is positive to the right and Y is positive downwards.

It is convenient to store these values not as millimeters but rather as pixel displacements where one pixel is the smallest unit by which it is possible to reference the printer and is equal to one sixteenth of a millimetre. The nearest pixel values of the displacements of the centres of the circles relative to R1 are thus take as follows:

|    | X mm   | Y mm | X Pixels | Y Pixels |
|----|--------|------|----------|----------|
| C1 | 3      | 3    | 48       | 48       |
| C2 | 15.124 | 3    | 242      | 48       |
| C3 | 3      | 10   | 48       | 160      |
| C4 | 9.062  | 6.5  | 145      | 104      |
| C5 | 15.124 | 10   | 242      | 160      |

Now for each circle the individual dot positions can be related to the centre of the circle by using sine and cosine functions, to give the following offsets:

| Point | X mm  | Y mm  | X pixels | Y pixels |
|-------|-------|-------|----------|----------|
| 1     | 0     | −3    | 0        | −48      |
| 2     | 1.93  | −2.3  | 31       | −37      |
| 3     | 2.95  | −0.52 | 47       | −8       |
| 4     | 2.5   | 1.5   | 40       | 24       |
| 5     | 1.03  | 2.82  | 16       | 45       |
| 6     | −1.03 | 2.82  | −16      | 45       |
| 7     | −2.5  | 1.5   | −40      | 24       |
| 8     | −2.95 | −0.52 | −47      | −8       |
| 9     | −1.93 | −2.3  | −31      | −37      |

It will be recalled that the digit zero is coded by omitting a dot altogether for that circle.

Thus any given dot position can be calculated by adding the offset of the dot relative to the circle centre and the displacement of the circle centre relative to the reference point R1 to the position of the reference point R1 on the paper. The points R1 and R2 are always printed.

When the sheet is fed through a reader, the reader is triggered by the occurrence of two isolated dots on the same horizontal at a spacing of 18.124 mm (290 pixels) and then responds to other dots arising at possible positions on the array. Known character recognition principles are used to compare the optically read data with tables similar to those used when printing to determine the number being coded.

The system can be used to enable identification of all types of printed matter including for example cheques or invoices where the amount involved is also coded.

Figure 5:
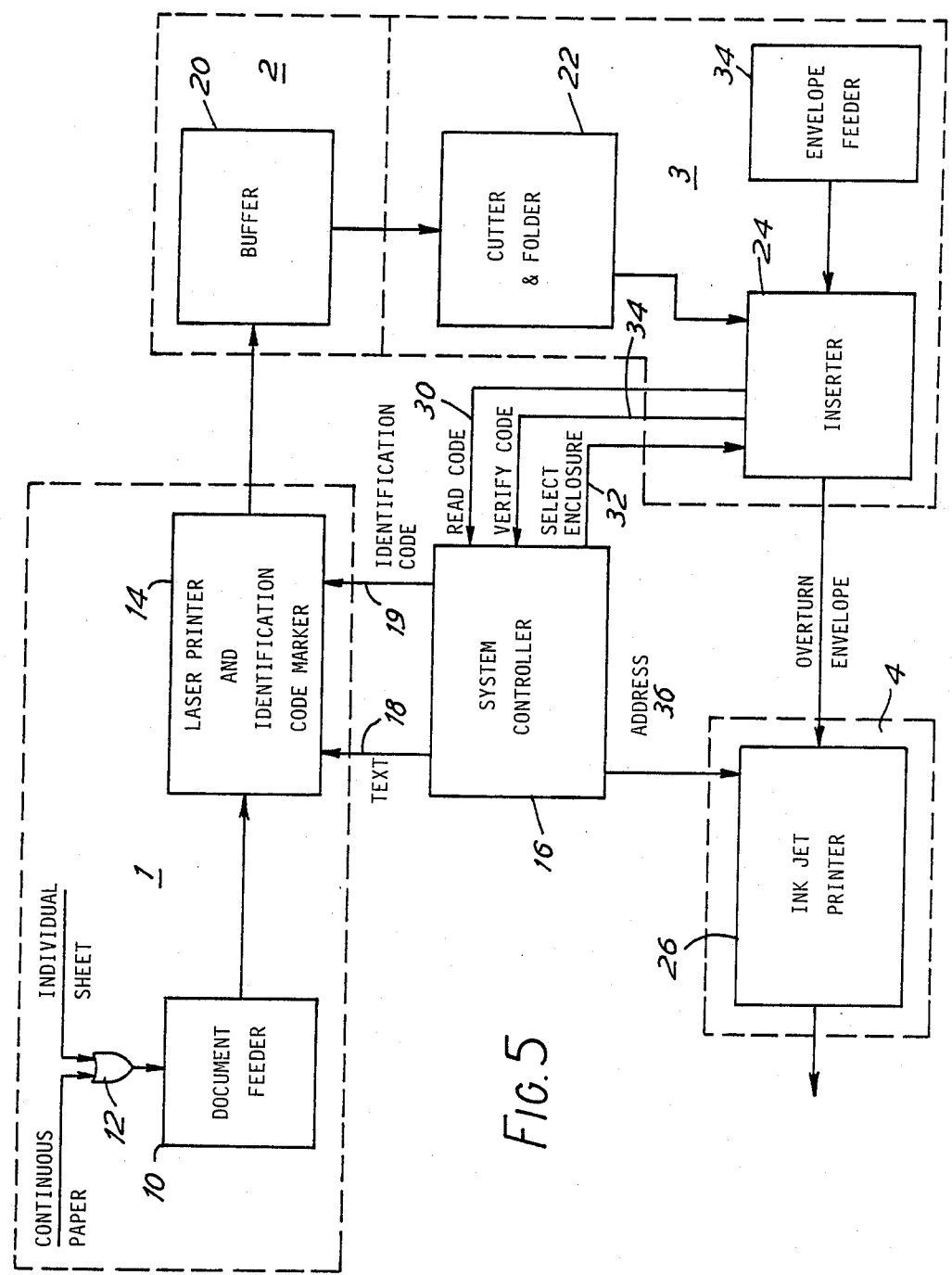
FIG. 5 is a block diagram showing the components of an automated printing and finishing process.

FIG. 5 shows how the identification system maybe included in a printing and packaging line of a direct mail system. The line is divided into four principal stages labelled 1 to 4 respectively. Stages 1 and 2 comprise a printing process sub-system and stages 3 and 4 comprise a finishing process sub-system.

Stage 1 of the system involves selecting the type of paper on which information is to be printed, feeding the paper into the printer and printing the desired information. A document feeder 10 is arranged to selectively feed either continuous stationery or cut sheet paper. The choice can be made by the user and is represented as OR function 12. The document feeder passes the selected paper type paper to the printer 14. The printer is preferably a laser printer which is especially suitable for large volume print runs. For printing on continuous stationery a Storage Technology 6100 cold set printer is suitable as a high speed printer. Where cut sheet paper is used a slower, high resolution printer is desirable as the print quality required for cut sheet paper is generally higher than that required for continuous stationery. The Agfa P400 printer is particularly suitable for use with cut sheet paper.

The text to be printed on the stationery is provided on line 18 from the central system computer 16, typically a Hewlett Packard HP 3000 series 40 computer. The text is prestored in the computer memory and the necessary instructions are fed from the computer to the laser printer. The printed text may be monitored and altered by the system operator as required. The central system control controls the timing of all operations in stages 1 to 4. However for the sake of clarity and simplicity the majority of control lines have been omitted. Where Storage Technology 6100 printer is used a dedicated 1BM 4341 or similar computer is required to maintain the printer protocol. An IBM 3780 serial interface may be used for communications between the IBM 4341 and the HP3000.40. Agfa P400 printers maybe connected directly to the HP3000.40 via serial lines.

Simultaneously with the text printing an individual identification mark is printed on each sheet by the printer 14. The formation printing and reading of the mark has already been described with reference to FIGS. 1 to 4. The numerical code given to each document may vary in an arithmetically ascending or descending scale, or may be another random or geometrical number sequence, where for example, security is required. The identification code is supplied from the controller 16 on line 19 and is sufficiently small not to be noticed by the naked eye.

In stage 2 of the process, stationery having both text and identification mark printed thereon is fed to a storage buffer 20 which constitutes the end of the printing sub-system.

Stage 3 involves packaging the stationery into individual envelopes and applying the correct address to each envelope. The packaging sub-system may include the insertion of enclosures, with, for example, a circular letter printed by the laser printer 14. The printed document is fed from the buffer 20 to a cutter and folder 22. Naturally the cutter is only necessary for continuous stationery. The document is folded in a concertina form, that is so that the part of the letter having the identification mark printed on it faces upwards so that the mark can be read. At this point an optical reader (not shown) scans the folded document to look for the existence and shape of an identification mark, and when found the mark read is fed back on line 30 to the controller which issues a enclosure select command on lines 32 to feed the appropriate enclosure with the document into an envelope. It will be appreciated that a direct mail operation spanning a large geographical area may require different enclosures to be sent to different regions. Thus, the facility to select the enclosure depending on the identification code is especially useful. The document and enclosures are then conveyed to an insertion machine 24. The insertion machine receives envelopes from an envelope feeder 34 and inserts both document and enclosure(s) (if any) into the envelope. The envelopes are supplied flap upwards and once filled must be turned over to allow the address to be printed. Before insertion the optical reader scans the document again and rereads the identification code. The code read is fed back to the controller on line 34 and if it is corresponds to that previously read the address corresponding to that code is fed from the look-up table in the controller to an ink-jet printer 26 which comprises stage 4. The filled and overturned envelope is then fed to the printer and the correct name and address is printed. The finished product is then transported to a store until distribution.

The optical reader may be an Alphavision system 100 manufactured by General Electric, Intelligent Vision Systems Operation, Orlando, Fla., USA which can read 3 pixel triangular code markings as previously described.

The insertion machine 24 may be, for example, a Vector 11000 and station inserter and the cutter/folder a compatible Mandagraph cutting and folding machine. The Mandagraph machine is controlled by commands from the insertion machine which in turn is controlled by the system controller 16 through a conventional RS 232 interface adaptor (not shown). This choice of inserter allows up to six enclosures to be selected and inserted with the cut and folded document into an envelope.

I claim:

1. A system for printing and packaging stationery, comprising a document feeder, a print arranged to receive documents from the document feeder and to printer thereon text and an identification code, the code comprising an array of a plurality of discrete marks, each mark representing a character and being sufficiently small to be unnoticeable to the naked eye, the relative positions of the marks providing the identification code, envelope supply means for providing a supply of envelopes for insertion of printed documents, insertion means arranged to receive envelopes from the envelope supply means and documents from the printer and to insert the documents into respective envelopes, reading means operable to read the code printed on an individual document prior to insertion into an envelope, control means coupled to the reading means and to a further printer to receive the code read from a document by the reading means and to cause the further printer to print on the envelope into which the insertion means inserts that document information stored by the control means and corresponding to the code read by the reading means.

2. A system according to claim 1 further comprising means for folding a printed document prior to insertion by the inserting means, the folding means being arranged to so fold a document as to enable reading of the printed code by the reading means.

3. A system according to claim 2 wherein the document feeder can selectively feed continuous or cut sheet stationery and the folding means includes selectively operable cutting means for cutting continuous stationery prior to folding.

4. A system according to claim 1, wherein the control means includes identification code generating means for generating the identification codes, the control means being coupled to the printer to supply an individual code to be printed on a respective document.

5. A system according to claim 1 comprising additional document supply means coupled to the control means and arranged to selectively supply an additional document to be inserted with a given document into an envelope, the control means responding to the code read by the reading means to optionally select a predetermined additional document to be supplied by the additional document supply means.

6. A method of printing and packaging documents, comprising the steps of feeding an unprinted document to a printer, printing text and an identification code on the document, the code comprising an array of a plurality of discrete marks, each mark representing a character and being sufficiently small to be unnoticeable to the normal observer, the relative positions of the marks providing the identification code, advancing the printed document to an insertion means, scanning the document to read the printed identication code, feeding an envelope from an envelope supply to the insertion means inserting the document in the envelope, feeding the read identification code as an address to a memory and printing on the envelop information from said memory stored at said address.

7. A method according to claim 6 comprising the steps of cutting and folding the printed document prior to scanning the document to read the identification code, the document being so folded to render the identification code readable during the scanning step.

8. A method according to claim 6 in which the array of discrete marks comprises at least one reference mark and a plurality of marks selected from positions on the periphery of one or more notional circles.

9. A method according to claim 6 wherein the identification marks are all the same shape and the document scanning step includes the step of comparing detected print on the document with the required shape of the identification mark.

10. A method according to claim 7 wherein prior to the scanning step the identification code is read from the folded document and the code is fed to said control means, and the control means selectively activates an additional document feeder to feed additional documents to the printed document for insertion with the printed document into an envelope, the additional documents fed being determined by the identification code.

11. A method according to claim 10, wherein the array of discrete marks comprises at least one reference mark and a plurality of marks selected from positions on the periphery of one or more notional circles.

12. A method according to claim 10, wherein the identification marks are all the same shape and the document scanning step includes the step of comparing detected print on the document with the required shape of the identification mark.

13. A method of printing and packaging a document comprising printing text and an identification code on the document, the text and code being supplied to a printer from a system controller, the code comprising an array of a plurality of marks, each mark representing a character and being sufficiently small to be unnoticeable to the normal observer, the relative positions of the marks providing the identification code, scanning the printed document to detect the code thereon, feeding the detected code to the system controller and causing printed information corresponding to the detected code stored by the system controller to be applied to an envelope into which the document is inserted.

14. A method according to claim 13 wherein before the scanning step the method further comprises the steps of folding the printed document, reading the code printed thereon, feeding the code read to the system controller and activating an additional document feeder to feed optionally at least one additional document for insertion in an envelope with the printed document, feeding of documents from the additional document feeder being dependent on the code read from the printed document.

15. A printing and packaging system for performing the method according to claim 13 comprising a system controller, a printer, the printer being coupled to the system controller to receive therefrom text and an identification code to be printed on a document fed to the printer, scanning means for scanning the printed document to detect the code printed thereon and for transmitting the code to the system controller, insertion means for inserting the printed document and any required additional documents into an envelope and a further printer coupled to the system controller for printing information on the envelope, the information to be printed on the envelope being fed from the system controller and being determined by the identification code received from the scanning means.

16. Apparatus for printing and packaging documents, comprising a document feeder arranged to receive continuous or cut sheet stationery, printer means arranged to receive stationery from the document feeder, a controller coupled to the printer for feeding to the printer text and an identification code to be printed on the document by the printer, holding means coupled to the printer for holding printed documents, cutting and folding means arranged to receive printed documents from the holding means and operable to fold a printed document in such a way as to render the identification mark readable and to cut continuous stationery into individual sheets, scanning means coupled to the controller for scanning the folded document to detect the printer identification mark, additional document feeder means coupled to the controller for optionally selecting additional documents to the printed documents, the controller being adapted to control additional documents fed in response to the detected identification code, insertion means arranged to insert the printed document with any selected additional documents into an envelope, and additional printing means coupled to the controlelr for printing on the envelope having documents inserted therein, information stored by the controller corresponding to the identification code detected by the scanning means.

17. A system for printing and packaging stationery, comprising a document feeder, a printer arranged to receive documents from the document feeder and to print thereon text and an identification code; the code comprising an array of a plurality of discrete marks, each representing a character and being sufficiently small to be unnoticeable to the naked eye, the relative positions of the marks providing the identification code, envelope supply means for providing a supply of envelopes for insertion of printed documents, insertion means arranged to receive envelopes from the envelope supply means and documents from the printer and to insert the documents into respective envelopes, reading means operable to read the code printed on an individual document prior to insertion into an envelope, control means coupled to the reading means and to a further printer to receive the code read from a document by the reading means and to cause information stored by the control means and corresponding to the code read by the reading means to be applied to the envelope into which the insertion means insert that document.

* * * * *

UNITED STATES PATENT AND TRADEMARK OFFICE
CERTIFICATE OF CORRECTION

PATENT NO. : 4 835 544
DATED : May 30, 1989
INVENTOR(S) : Charles B. WINTERBURN

It is certified that error appears in the above-identified patent and that said Letters Patent is hereby corrected as shown below:

Column 5, line 30; change "print" to ---printer---.
        line 32; change "printer" to ---print---.
Column 6, line 19; change "envelop" to ---envelope---.
Column 8, line  8; change "controlelr" to ---controller---.

Signed and Sealed this

Nineteenth Day of June, 1990

*Attest:*

HARRY F. MANBECK, JR.

*Attesting Officer*      *Commissioner of Patents and Trademarks*